United States Patent [19]

Politz

[11] 3,731,326
[45] May 8, 1973

[54] POP-UP BALL ROD CONSTRUCTION
[75] Inventor: William E. Politz, Delphi, Ind.
[73] Assignee: Stephen A. Young, Monticello, Ind.
[22] Filed: June 25, 1971
[21] Appl. No.: 156,849

[52] U.S. Cl. ..................................................4/203
[51] Int. Cl. .............................................E03c 1/22
[58] Field of Search...........................4/195, 199, 200, 4/201, 202, 203, 204, 249, 287

[56] References Cited

UNITED STATES PATENTS

| 3,419,919 | 1/1969 | Stayner | 4/203 |
| 3,552,426 | 1/1971 | Hester | 137/375 |
| 3,111,271 | 11/1963 | Lofgren | 251/368 X |

Primary Examiner—Henry K. Artis
Attorney—Robb & Robb

[57] ABSTRACT

There is disclosed what is known as a pop-up fitting, commonly used in the domestic plumbing art for regulation of outflow from lavatories or similar fixtures, in this case the pop-up including certain usual elements to mount the same in the drain outlet of such a fixture, and including a plunger member which is operable to regulate flow through the seat portion of said member, one of the problems solved hereby being the relatively corrosive effects of soapy water used in the lavatory and having a detrimental effect upon the operating means known as the ball rod of such a pop-up by reason of build-up of chemical materials and other types of material which would adversely affect the construction by corroding the ball rod in such a manner as to make the same inoperable, the concept herein residing in the enclosing of the portion of the operating device in the water passage by a material not affected by corrosive elements, and at the same time having the necessary lubricating qualities to facilitate easy operation.

5 Claims, 4 Drawing Figures

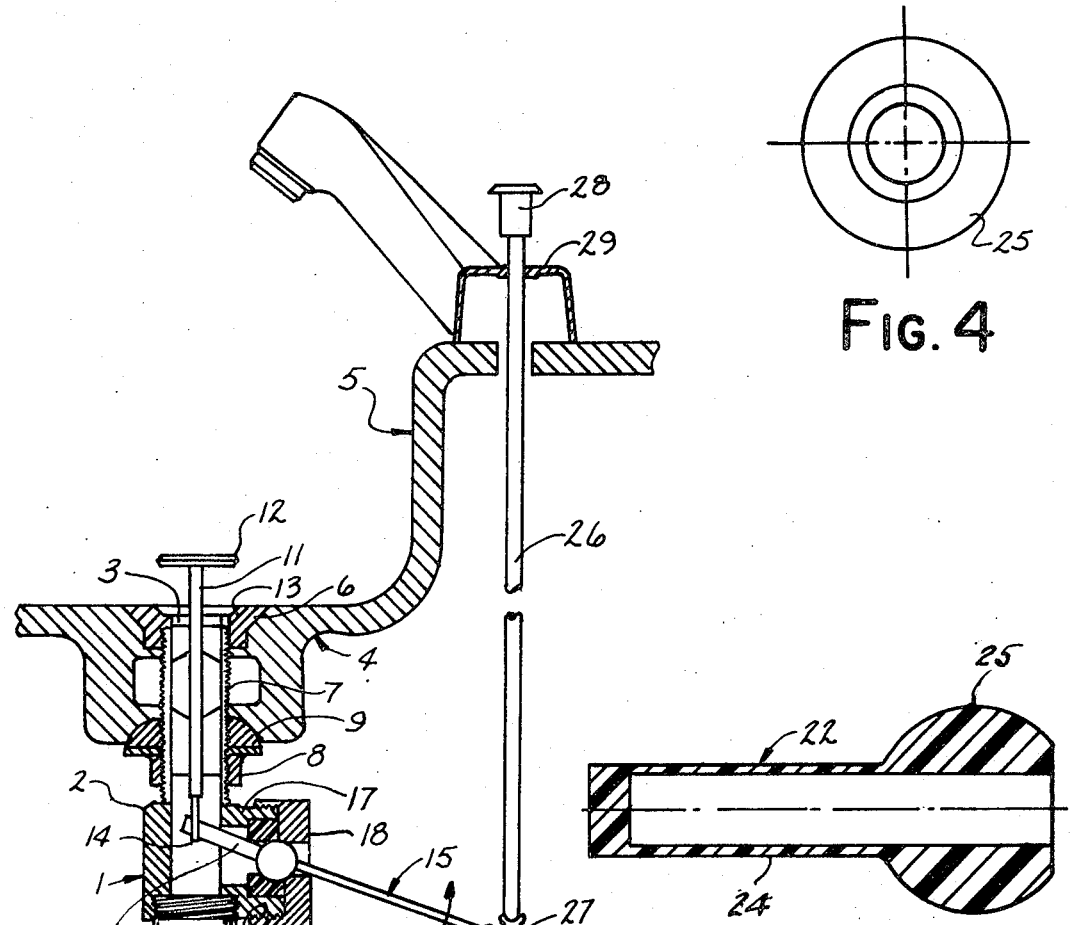
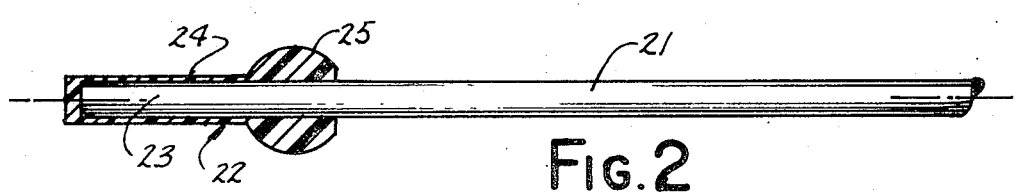
Fig. 1
Fig. 2
Fig. 3
Fig. 4
INVENTOR.
W. E. POLITZ

POP-UP BALL ROD CONSTRUCTION

OBJECTS OF THE INVENTION

The primary object of the invention hereof is to provide a pop-up fitting in which the usual plunger member is provided to operate in a body for control of liquid through an outlet of a lavatory or the like, the plunger member being connected to what is known as a ball rod, of special construction, which will permit the rod to be made relatively inexpensively and of non-corrosive materials since it includes a portion which is shielded from corrosive effects.

A further object of the invention is to provide a pop-up fitting of the class described, in which a ball rod is made of composite nature, having a basically inexpensive rod portion of steel or the like which may or may not be plated, the other portion of the rod including a ball and cover member which shields the rod from corrosive effects and at the same time provides a fulcrum member to facilitate the rocking movement required for regulating flow through the body of the fitting.

A further object is to provide a novel construction of ball rod member in which the rod may be formed of steel or similar relatively inexpensive material, and the ball portion includes a cover and ball formed of nylon or similar synthetic material which not only shields the portion of the rod extending into the passage from the corrosive effects of liquids passing therethrough, but at the same time by reason of its inherent lubricity, facilitates the rocking movement required in this type of fitting to raise and lower a plunger to open and shut the passage through which the liquid passes from the lavatory fixture itself.

Other and further objects of the invention will be understood from a consideration of the specification appended hereto and disclosed in the drawing, wherein:

FIG. 1 is a fragmentary sectional view showing the various elements of the pop-up fitting and the environment in which the invention hereof is contained.

FIG. 2 is a somewhat enlarged view, in section partly, showing what is known as a ball rod with the cover and ball in position thereon.

FIG. 3 is the cover and ball member portion of the device in greatly enlarged section.

FIG. 4 is an end view of FIG. 3.

DESCRIPTION OF THE INVENTION

Referring now to FIG. 1, the invention hereof is included in the pop-up fitting generally denoted 1, having the body portion 2 thereof including therewithin a vertically extending passage 3, the body 2 being mounted in the outlet section 4 of the lavatory generally denoted at 5 and being of usual construction of china or material as used in the domestic bathroom.

The body 2 is mounted in the outlet portion 4 of the fixture 5 by suitable threaded seat member 6 at the upper end thereof engaging the exterior threads 7 on the body 2, the threads 7 at their lower ends and likewise having mounted thereon a suitable nut 8 with the usual seating washer 9 supported there above so as to seal the outlet of the lavatory by the pop-up unit now being described.

A tail piece 10 is provided in the usual manner for connection to the drain not otherwise illustrated but well-known in the art.

Mounted in the passage 3 of the body 2 is a suitable plunger 11 having the seat head 12 at the upper end thereof arranged to engage the seat 13 in the seat member 6.

At the lower end of the plunger 11 there is provided a suitable portion 14, having an opening therein for connection to a ball rod member generally denoted at 15, and to be more particularly described subsequently.

The ball rod member 15 is in turn supported for rocking movement in the direction of the arrows 16 in a socket 17 formed in the body 2 and having suitable nut 18 thereon, engaging with threads 19 on the socket, the nut 18 having the threads 20 therein for that purpose.

The ball rod device 15 is comprised as shown in FIG. 2 of a composite nature, including the basic cylindrical rod 21 of suitable length, and in this instance being formed of steel or some similar relatively inexpensive material in contrast to brass or other material such as stainless steel which is commonly used in other types of fittings.

In this instance the cover and ball member illustrated by itself in FIG. 3, and denoted 22 generally, is mounted on one end of the rod 21, this being the exterior section of the rod so to speak, with a portion upon which the cover and ball member 22 is seated, being denoted the rod portion 23.

The cover and ball member 22 includes a cover portion 24 which is relatively thin in cross section, and completely surrounds the section 23, being integral with the ball 25.

It will be noted that for purposes of manufacture the cover and ball member 22 may be molded of nylon and preferably of a material at least equivalent to nylon by reasons of the fact that it is very resistant to corrosion and has certain lubricating qualities which are advantageous as far as the ball portion 25 thereof may be concerned.

Since the cover portion 24 extends into the opening at the portion 14 of the plunger 11, lubricating aspects will likewise be advantageous at this point.

In order to operate the ball rod device 15, in a rocking manner, a suitable lift rod 26 may be provided, having the connection at 27 with the device 15, and being equipped with a knob at 28 passing through the water control faucet portion 29 of a conventional fitting.

Thus, by raising and lowering of the knob 28 the ball rod device 15 will be rocked about the ball 25 to raise and lower the head 12 against the seat 13 to control liquid flow.

It is emphasized that the construction of this composite nature is relatively less expensive than prior constructions because of its availing of steel or similar normally somewhat corrosive material, but the portion which is directly in the path of flow of corrosive liquids is covered by the cover and ball member hereof.

I claim:

1. In a drain fitting construction, in combination, a drain body for mounting in a drain outlet, a seat in said body, a drain passage therethrough, a plunger in said passage having a portion movable toward and away from the seat to regulate liquid flow through said passage, a ball socket in said body adjacent said passage, a ball rod device supported in said socket to move the plunger by rocking movement with respect to the body, said device having a portion extending into the passage and a section exterior thereof, said section being connectible to operating means for rocking the device, and a separate cover and ball member of non-corrosive composition, mounted on the portion extending into said passage and completely shielding the same from liquid passing through the passage, including a fulcrum means positioned in the socket to facilitate the rocking movement aforesaid.

2. The combination as claimed in claim 1, wherein the cover and ball member is comprised of synthetic plastic material.

3. The combination as claimed in claim 1, wherein the portion and section of the ball rod device comprise a cylindrical rod.

4. The combination as claimed in claim 1, wherein the cover and ball member is comprised of nylon.

5. The combination as claimed in claim 1, wherein the ball rod device comprises a rod and a cover and ball member of plastic material, having properties to resist chemical and mechanical deformation pressed on one end of said rod.

* * * * *